UNITED STATES PATENT OFFICE.

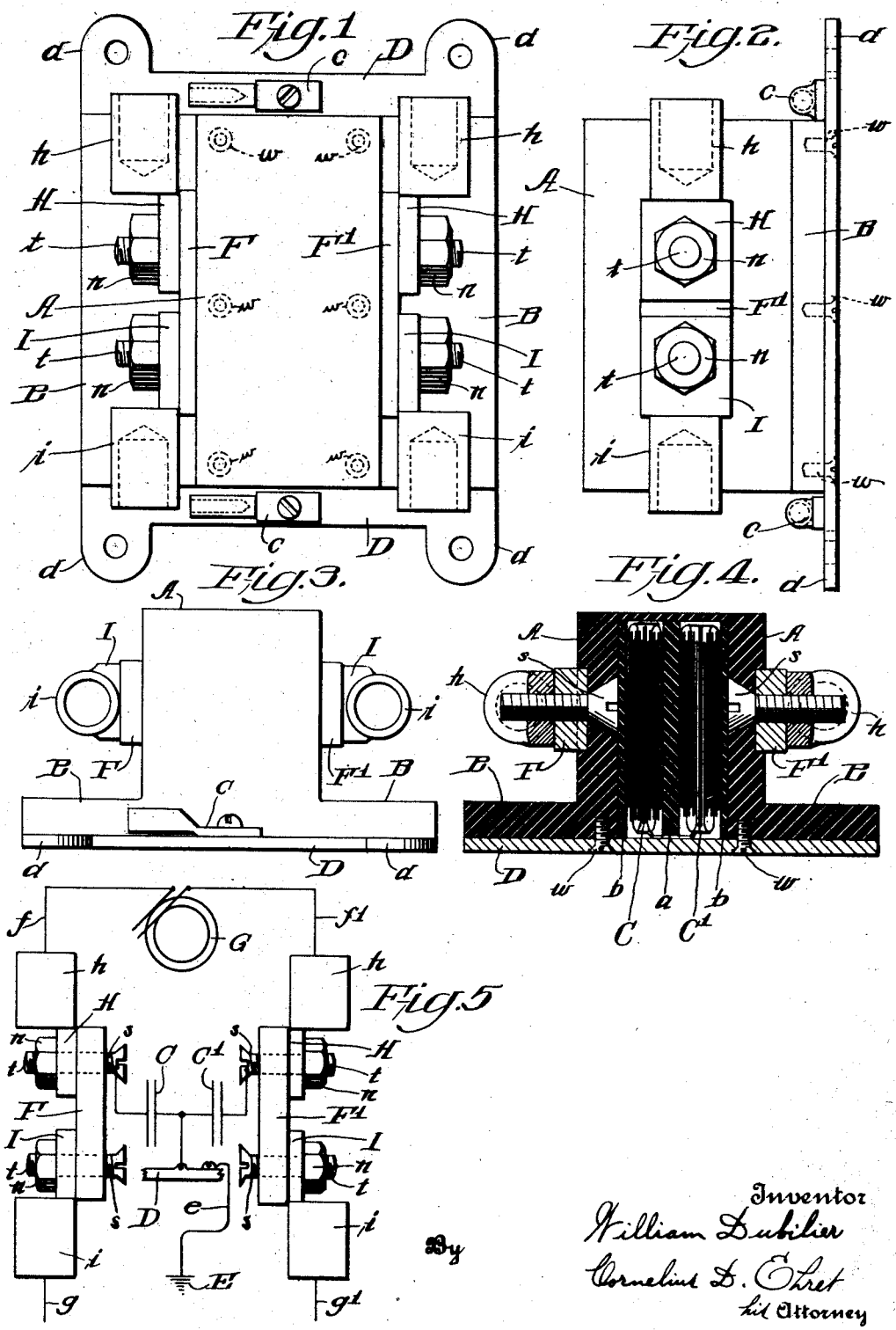

WILLIAM DUBILIER, OF NEW YORK, N. Y.

PROTECTIVE UNIT.

1,281,309.   Specification of Letters Patent.   Patented Oct. 15, 1918.

Application filed February 9, 1918. Serial No. 216,327.

*To all whom it may concern:*

Be it known that I, WILLIAM DUBILIER, a citizen of the United States, residing in the city and county of New York, State of New York, have invented a new and useful Protective Unit, of which the following is a specification.

My invention relates to a device for protecting electrical apparatus or circuits, as against the effects produced by fluctuating or alternating current, and particularly against the effects of high frequency oscillations such as are produced in or induced by radio telegraphic or radio telephonic apparatus.

My invention resides in a compact protective unit comprising a casing or housing of insulating material within which is disposed a condenser or a plurality of condensers in electrical communication with one or more external conductors of structure suitable for connecting the device in operative relation with the circuit or apparatus to be protected.

My invention resides in an electrical protective device of the character hereinafter described and claimed.

For an illustration of one of the various forms my invention may take, reference is to be had to the accompanying drawing, in which:

Figure 1 is a top plan view of a protective device embodying my invention.

Fig. 2 is a side elevational view of the same.

Fig. 3 is an end elevational view of the same.

Fig. 4 is a vertical cross sectional view of the same.

Fig. 5 is a diagrammatic view illustrating a mode of connection of the protective device.

Referring to the drawing, A is a casing or housing of insulating material, preferably molded in a single unit, with a chamber or cavity formed therein. The casing A has the bottom extensions or flanges B, which extend preferably to the extreme edge of the metal base plate D having the ears or lugs $d$ by which the device as a whole may be fastened to any suitable support, as by screws extending through the holes in the ears $d$. Carried by the side walls of the casing A are the metal bus bars F and $F^1$ into which are threaded screws $s$, the screw heads and the bus bars being preferably molded in the insulating material of the casing A and so held and supported thereby. To each bus bar is secured a wire or cable terminal H having the parts $h$ suitably bored, as indicated in dotted lines in Figs. 1 and 2, to receive the ends of wires or cables, as $f$ and $f^1$, Fig. 5. To the bus bars are secured further wire or cable terminals I having the parts $i$ also suitably bored to receive wires or cables, as $g$ and $g^1$, Fig. 5. The terminals H and I may be secured to the bus bars in any suitable way, as by nuts $n$ threaded upon studs $t$ secured to the bus bars, these studs in the example illustrated being the outer ends of the screws $s$.

As seen in Fig. 4, the pocket or cavity in the casing or housing A is open at its bottom. In this chamber are placed the condenser units C and $C^1$, of any suitable structure and any suitable number of sections. These condensers are preferably built up of alternating sheets of insulating material and metal foil, the insulating material preferably being mica, and are preferably of the self-protecting type described in my application Serial Number 212,096. These condenser units are supported in position between the middle member $a$ of insulating material and the outer members $b$, $b$, also of insulating material, the material for these members being preferably mica, of suitable number of layers or thickness. The condenser units are in effect wedged or held in place between and by these members $a$ and $b$. The chamber pocket is covered or closed by the aforementioned base plate D, which is suitably secured, as by screws $w$, to the housing or casing member A after the condenser units have been put in place. On either or both ends of the base plate D may be secured a wire or cable terminal $c$ for receiving a conductor as $e$, Fig. 5.

As indicated in Fig. 5, one terminal of each of the condenser units C, $C^1$ connects with the base plate D; the other terminal of the unit C connects with the bus bar F, as by connecting to the screw $s$, and the other terminal of the unit $C^1$ is similarly connected to the bus bar $F^1$. With the wire or cable terminal $c$ is connected a conductor $e$ which is earthed or grounded at E. The apparatus to be protected, for example a dynamo-electric machine, as generator G, has its one terminal connected by wire or cable $f$ connected and terminating in the bored part $h$ of the terminal H which is connected to the bus bar F; similarly, the other terminal of G is connected by wire or cable $f^1$ similarly connecting to the terminal H in electrical contact with the bus bar $F^1$. The wires or cables $g$ and $g^1$ connect to the line or radio apparatus. Any high frequency oscillations running back upon the wires or cables $g$ or $g^1$, or induced in them, readily pass through the condenser units to ground or earth E without reaching, or at any rate, without damaging the apparatus G.

It will be noted that as part of the protective device there are provided the heavy bus bars F and $F^1$ which form a link in each side of the circuit of generator G which carries a considerable amount of electric energy. And the terminals I of the line are always separate and distinct in a structural sense from the terminals H communicating with the machine G. Thus the protective unit forms not only a protective arrangement connected between the line and apparatus and earth, but also affords connecting links or elements between the line and apparatus. By such structure, when the unit is removed, the line and generator are isolated from each other and are not again operatively connected until the insertion of a protective unit. In other words, the use of the bus bars and the separate terminals H and I afford a structure which does not readily afford connection between line and generator except by insertion of the protective unit. The protective unit cannot be removed without breaking the circuit to be protected, and accordingly if the protective unit is burnt out or otherwise injured, its removal opens the circuit which is not reëstablished until insertion of a new protective unit.

Furthermore, in the arrangement illustrated, the bus bars and the connectors are on the sides of the insulating housing below the top thereof, whereby the terminals are not readily short circuited by a conductor falling or placed across the top of the casing A. Similarly, the flanges B extending to the extreme sides of the base plate D further insure against accidental grounding or short circuiting.

What I claim is:

1. A protective unit comprising a housing of insulated material, a condenser inclosed within the same, a bus bar connected with said condenser and carried by said housing, and conductor terminals secured to and connected by said bus bar.

2. A protective unit comprising a housing of insulating material, a condenser inclosed within the same, a bus bar connected with said condenser and carried by said housing, conductor terminals secured to and connected by said bus bar, and a base plate carrying said housing.

3. A protective unit comprising a housing of insulating material, a condenser inclosed within the same, a bus bar connected with said condenser and carried by said housing, conductor terminals secured to and connected by said bus bar, a base plate carrying said housing, and a connection from said condenser to said base plate.

4. A protective unit comprising a housing of insulating material, a plurality of condensers inclosed therein, bus bars connected with said condensers and carried by said housing, conductor terminals connecting with said bus bars and with conductors of a circuit to be protected, and a plate with which the remaining terminals of said condensers are connected, secured to said housing and adapted to be connected to earth.

5. A protective unit comprising a housing of insulating material, a condenser inclosed therein, a bus bar molded in said housing and partly exposed on the exterior thereof, a connection from said condenser to said bus bar, and means for connecting said bus bar to adjacent ends of one side of a circuit to be protected.

6. A protective unit comprising a housing of insulating material, a condenser inclosed therein, a bus bar molded in said housing and partly exposed on the exterior thereof, a connection from said condenser to said bus bar, and means for connecting said bus bar in series with a conductor of a circuit to be protected.

7. A protective unit comprising a housing of insulating material, a condenser inclosed therein, a bus bar molded in said housing and partly exposed on the exterior thereof, a connection from said condenser to said bus bar, means for connecting said bus bar to a conductor of a circuit to be protected, and a plate secured to said housing and connected to the other terminal of said condenser.

8. A protective unit comprising a block of insulating material having a chamber, a condenser in said chamber, a plate forming a closure for said chamber, a bus bar carried by said housing and connected with said condenser, and means for connecting said bus bar with the conductor of a circuit to be protected.

9. A protective unit comprising a block of insulating material having a chamber, a condenser in said chamber, a plate forming a closure for said chamber, a bus bar carried by said housing and connected with said condenser, means for connecting said bus bar with the conductor of a circuit to be protected, and a connection from the other terminal of said condenser to said plate.

10. A protective unit comprising a block of insulating material having a chamber, a plurality of condensers in said chamber, a plate closing said chamber, bus bars carried by said housing and connected to said condensers, means for connecting said bus bar with conductors of a circuit to be protected, a connection from said condensers to said plate, and means for grounding said plate.

11. A protective device comprising a block of insulating material having a chamber, a condenser therein, a bus bar carried by said housing on the side thereof and below its top, a connection between said condenser and bus bar, and means for connecting said bus bar to the conductor of a circuit to be protected.

12. A protective device comprising a block of insulating material having a chamber, a condenser therein, a bus bar carried by said housing on the side thereof and below its top, a connection between said condenser and bus bar, means for connecting said bus bar to the conductor of a circuit to be protected, a base plate, and insulating material disposed beneath said bus bar between the same and said plate.

13. A protective unit comprising a housing of insulating material having a chamber, a plurality of condensers therein, a base plate forming a closure for said chamber, connections from said condensers to said plate, bus bars carried by said housing on opposite sides thereof below its top, connections from said condensers to said bus bars, and insulating material below said bus bars between the same and said plate.

14. A protective unit comprising a housing of insulating material having a chamber, a plurality of condensers therein, a base plate forming a closure for said chamber, connections from said condensers to said plate, bus bars carried by said housing on opposite sides thereof below its top, connections from said condensers to said bus bars, insulating material below said bus bars between the same and said plate, and means for grounding said plate.

15. A protective device comprising a housing of insulating material having a chamber, a condenser in said chamber, and a conducting member carried by said housing and connected with one terminal of said condenser, said member affording means for connecting together adjacent ends of one side of a circuit to be protected by said condenser.

16. A protective device comprising a housing of insulating material, condensers inclosed therein, conductors, one for each condenser, carried by said housing and connected to said condensers, and means for connecting adjacent ends of one side of a circuit to be protected to each of said members.

17. A protective device comprising a housing of insulating material, condensers inclosed therein, conductors, one for each condenser, carried by said housing and connected to said condensers, means for connecting adjacent ends of one side of a circuit to be protected to each of said members, a plate secured to said housing and connected to the remaining terminals of said condensers, and means for connecting said plate to earth.

18. A protective unit comprising a housing, a condenser inclosed therein, a bus bar carried by said housing and connected with said condenser, and means for connecting adjacent ends of one side of a circuit to be protected by said condenser to separated points on said bus bar.

19. A protective unit comprising a housing of insulating material, condensers inclosed therein, means for connecting a terminal of each of said condensers to earth, a bus bar for each of said condensers carried by said housing and connected to the remaining terminal of a condenser, and means for connecting to separated points of each bus bar adjacent terminals of one side of a circuit to be protected.

In testimony whereof I have hereunto affixed my signature this 7 day of February, 1918.

WILLIAM DUBILIER.